(12) United States Patent
Whitley

(10) Patent No.: US 9,551,412 B1
(45) Date of Patent: Jan. 24, 2017

(54) GEARBOXES AND RELATED ASSEMBLIES

(71) Applicant: Technicon LLC, Huntersville, NC (US)

(72) Inventor: Ralph Whitley, Huntersville, NC (US)

(73) Assignee: JD Components, LLC, Madison, WI (US)

(*) Notice: Subject to any disclaimer, the term of this patent is extended or adjusted under 35 U.S.C. 154(b) by 0 days.

(21) Appl. No.: 14/826,428

(22) Filed: Aug. 14, 2015

(51) Int. Cl.
*F16H 57/02* (2012.01)
*F16H 57/032* (2012.01)
*F16H 57/025* (2012.01)

(52) U.S. Cl.
CPC .......... *F16H 57/032* (2013.01); *F16H 57/025* (2013.01); *F16H 2057/0325* (2013.01)

(58) Field of Classification Search
CPC ............ F16H 2057/0325; F16H 57/032; F16H 57/025
See application file for complete search history.

(56) References Cited

U.S. PATENT DOCUMENTS

| 5,446,326 | A | 8/1995 | Scheider | |
|---|---|---|---|---|
| 5,816,116 | A * | 10/1998 | Antony | F16H 57/025 74/606 R |
| 6,971,277 | B2 * | 12/2005 | Schlenker | F16H 1/16 74/425 |
| 8,584,553 | B2 | 11/2013 | Campbell et al. | |
| 2004/0031343 | A1 | 2/2004 | Tsergas | |
| 2007/0193408 | A1 | 8/2007 | Martinez | |
| 2010/0083793 | A1 * | 4/2010 | Ko | F16H 25/20 74/640 |
| 2010/0204357 | A1 * | 8/2010 | Chasser | C09D 7/1216 523/122 |
| 2010/0307273 | A1 | 12/2010 | Adcock | |
| 2010/0330142 | A1 * | 12/2010 | Falk | A01N 43/80 424/421 |
| 2011/0017013 | A1 | 1/2011 | Bader | |
| 2011/0277589 | A1 * | 11/2011 | Leibold | F16H 57/032 74/606 R |

FOREIGN PATENT DOCUMENTS

| CN | 2706629 | 6/2005 |
|---|---|---|
| CN | 201787000 | 4/2011 |
| CN | 202992032 | 6/2013 |
| CN | 203309073 | 11/2013 |
| CN | 104110484 | 10/2014 |
| DE | 102012008895 | 11/2013 |
| EP | 1453182 | 9/2004 |

OTHER PUBLICATIONS

Kruse, David J., "Data Acquisition Techniques and Measurement Equipment for Belt Conveyors," http://www.beltcon.org.za/docs/b1304.pdf, 2007, 8 pages.

Brochure, "Hub City has revolutionized high efficiency washdown geardrives!" available as of filling date, 4 pages.

* cited by examiner

*Primary Examiner* — Vicky Johnson
(74) *Attorney, Agent, or Firm* — Reinhart Boerner Van Deuren P.C.

(57) ABSTRACT

A gearbox housing assembly includes a base plate, a metal inner gearbox housing coupled to the base plate and a polymer outer gearbox housing on the base plate and surrounding the inner housing.

11 Claims, 13 Drawing Sheets

GEARBOXES AND RELATED ASSEMBLIES

BACKGROUND

The food processing industry requires continuous hygienic and sanitary conditions. Gear drive assemblies are used to power some food preparation equipment such as augers and conveyors.

Gearbox housings used with such gear drive assemblies are typically formed using cast iron or cast stainless steel methods. The shape of these gearbox housings is constrained by molten metal flow and cooling rates that determine critical internal and external geometrical features. Subsequent machining is required to finish the product to final shape.

The final shape is typically square or rectangular with flat surfaces and sharp edges. Many designs also include gaps, pockets and/or ledges. The metal also often has cracks that can worsen over time. These designs have a tendency to trap foreign objects such as food and food fluids which can remain even after pressure washing. As a result, bacteria and foodborne pathogens can collect on the gearbox.

In the food processing industry and other industries concerned with microbial growth, it is common to have a cast iron gearbox housing painted to prevent corrosion and rust. The high pressure washdown process used in these industries often damages the paint and causes the paint to chip thereby leaving open cast iron surfaces that eventually rust. In addition, paint chips and/or rust can get in the processed material (e.g., food).

Stainless steel is also used for the housings in the food processing industry and other industries concerned with microbial growth (however at a lower volume due to the higher price compared to painted cast iron). Stainless steel is sometimes chosen due to its mechanical strength, corrosion resistance, longevity and ease of fabrication. However, it has been shown that even with cleaning and sanitation procedures consistent with good manufacturing practices, microorganisms can remain in a viable state on stainless steel equipment surfaces. In addition, stainless steel alloys have been shown to be ineffective at reducing microbial load once they are contaminated.

Antibacterial stainless steel can be produced by adding an antimicrobial element to the alloy. Doping of stainless steel with Ag+-ions can be achieved without loss of its physical properties. However, silver coatings on stainless steel are non-permanent, because the modified surface layer is very thin, and once worn off, the base material loses its antibacterial ability.

Current metal gearboxes are also heavy and subject to a relatively wide range of tolerances in critical areas. These gearboxes can be difficult to install and may require trial and error measurements and adjustments (e.g., shimming).

U.S. Pat. No. 8,584,553 describes a polymer gearbox housing assembly provided in three pieces that are held together with tongue-and-groove mechanisms. The three-piece design can lead to a more expensive and time-consuming fabrication and/or installation. Also, while the '553 patent proposes a contoured outer surface to facilitate cleaning, foreign objects may collect in joints or seams formed between adjacent pieces of the gearbox housing. In addition, required tolerances are difficult to maintain with this design at least because the entire outer edge of the gearbox is the mating point used to combine the pieces. Furthermore, this design is relatively dimensionally unstable due to the multi-piece design and the lack of additional components or housings that can provide structural rigidity during use.

SUMMARY

Some embodiments of the present invention are directed to a gearbox housing assembly including a base plate, a metal inner gearbox housing coupled to the base plate and a polymer outer gearbox housing on the base plate and surrounding the inner housing.

In some embodiments, the outer housing is molded (e.g., injection or compression molded). The polymer of the outer housing may be impregnated with antimicrobial additives. The outer housing may be monolithic.

In some embodiments, the outer housing includes an elongated arcuate top surface.

In some embodiments, the inner housing includes a front surface with a front aperture defined therein, the outer housing includes a front surface with a front aperture defined therein that is aligned with the front aperture of the inner housing, and the aligned front apertures are configured to receive an input shaft therethrough. The inner housing may include a first side surface with a first side aperture defined therein and an opposed second side surface with a second side aperture defined therein. The outer housing may include a first side surface with a first side aperture defined therein that is aligned with the first side aperture of the inner housing and an opposed second side surface with a second side aperture defined therein that is aligned with the second side aperture of the inner housing. The aligned first side aligned apertures and the aligned second side aligned apertures may be configured to receive an output shaft therethrough.

In some embodiments, a first bearing cap is coupled to the first side surface of the outer housing and a second bearing cap is coupled to the second side surface of the outer housing.

The first side surface of the outer housing may be surrounded by a first side raised portion defining a first side recess. The first bearing cap may include a first plate held in the first side recess such that the first outer plate is flush with the first side raised portion. The second side surface of the outer housing may be surrounded by a second side raised portion defining a second side recess. The second bearing cap may include a second plate held in the second side recess such that the second outer plate is flush with the second side raised portion.

The first bearing cap may include a first cylindrical portion extending from the first plate and through the aligned first side apertures of the inner and outer housings. The second bearing cap may include a second cylindrical portion extending from the second plate and through the aligned second side apertures of the inner and outer housings.

In some embodiments, a motor flange is coupled to the front surface of the outer housing. The front surface of the outer housing may be surrounded by a front raised portion defining a front recess. The motor flange may include a motor flange plate held in the front recess such that the motor flange plate is flush with the front raised portion.

In some embodiments, the first side raised portion and the front side raised portion define an open channel therebetween that slopes outwardly from a top of the outer housing to a bottom of the outer housing. In some embodiments, the second side raised portion and the front side raised portion define an open channel therebetween that slopes outwardly from the top of the outer housing to the bottom of the outer housing.

In some embodiments, the outer housing includes a back surface. The first side raised portion and the back surface may define an open channel therebetween that slopes outwardly from the top of the outer housing to the bottom of the outer housing. The second side raised portion and the back surface may define an open channel therebetween that slopes outwardly from the top of the outer housing to the bottom of the outer housing.

Some other embodiments of the present invention are directed to a gearbox housing assembly. The assembly includes a polymer base plate including mounting features configured to mount to a mounting surface and a polymer gearbox housing on the base plate. The polymer gearbox housing includes a front portion including a front opening configured to receive an input shaft therethrough, a first side portion including a first side opening configured to receive a first end of an output shaft therethrough, and a second opposite side portion comprising a second side opening configured to receive a second opposite end of the output shaft therethrough.

In some embodiments, the polymer gearbox housing is molded and includes an antimicrobial additive that is blended throughout the polymer. The polymer gearbox housing may be monolithic.

In some embodiments, the polymer gearbox housing is an outer housing and the assembly includes a metal inner gearbox housing coupled to the base plate with the outer housing coupled to the inner housing.

In some embodiments, the inner housing includes a front wall with a front opening defined therein that is aligned with the front opening of the outer housing and configured to receive the input shaft therethrough, a first sidewall with a first side opening defined therein that is aligned with the first side opening of the outer housing and configured to receive the first end of the output shaft therethrough, and a second sidewall with a second side opening defined therein that is aligned with the second side opening of the outer housing and configured to receive the second end of the output shaft therethrough.

Further features, advantages and details of the present invention will be appreciated by those of ordinary skill in the art from a reading of the figures and the detailed description of the preferred embodiments that follow, such description being merely illustrative of the present invention.

DETAILED DESCRIPTION

Figure 1:
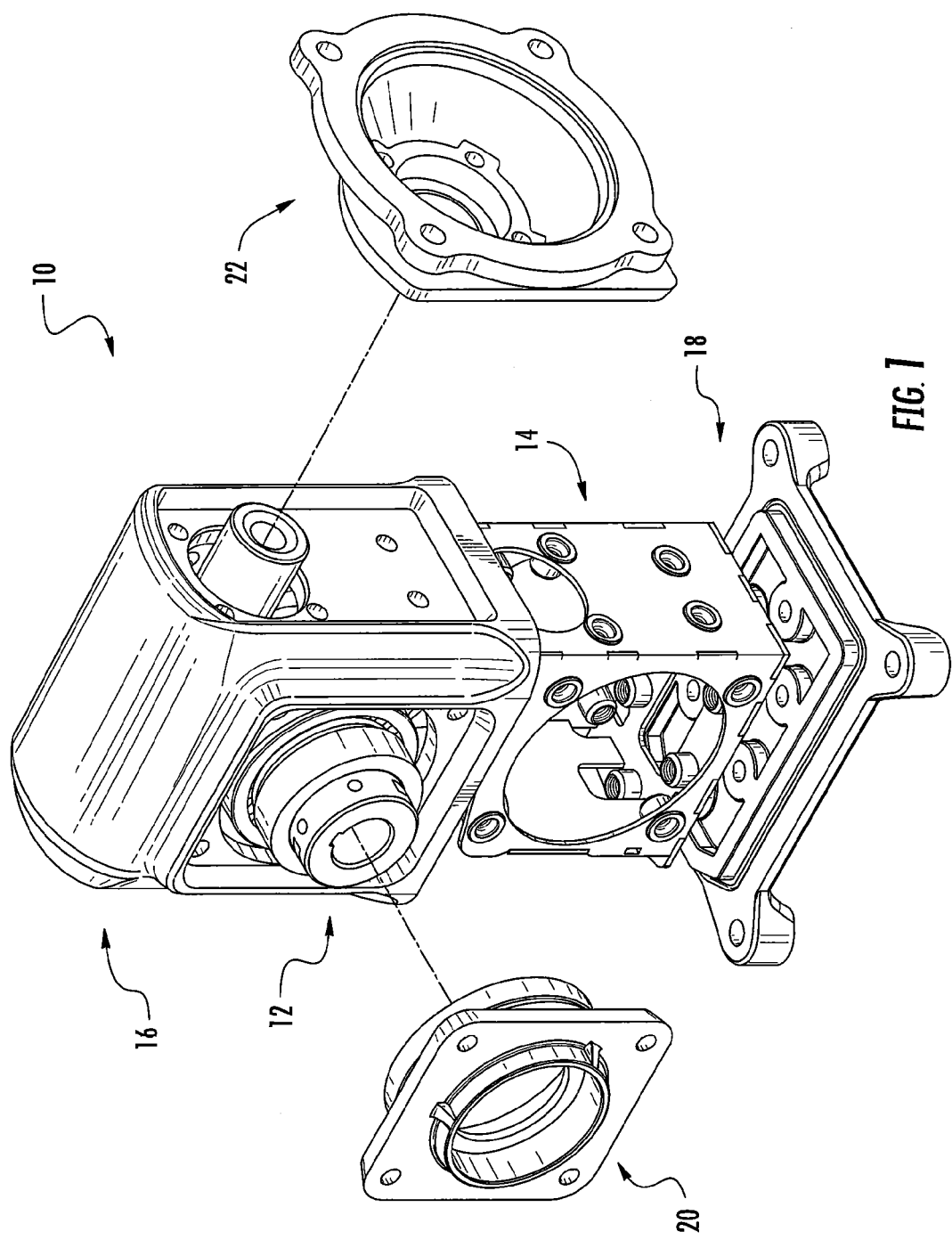
FIG. 1 is an exploded perspective view of a gear drive and gearbox assembly according to some embodiments.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout. As used herein the term "and/or" includes any and all combinations of one or more of the associated listed items.

In addition, spatially relative terms, such as "under," "below," "lower," "over," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

Well-known functions or constructions may not be described in detail for brevity and/or clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

It is noted that any one or more aspects or features described with respect to one embodiment may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail in the specification set forth below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "monolithic" means an object that is a single, unitary piece formed or composed of a material without joints or seams.

Figure 2:
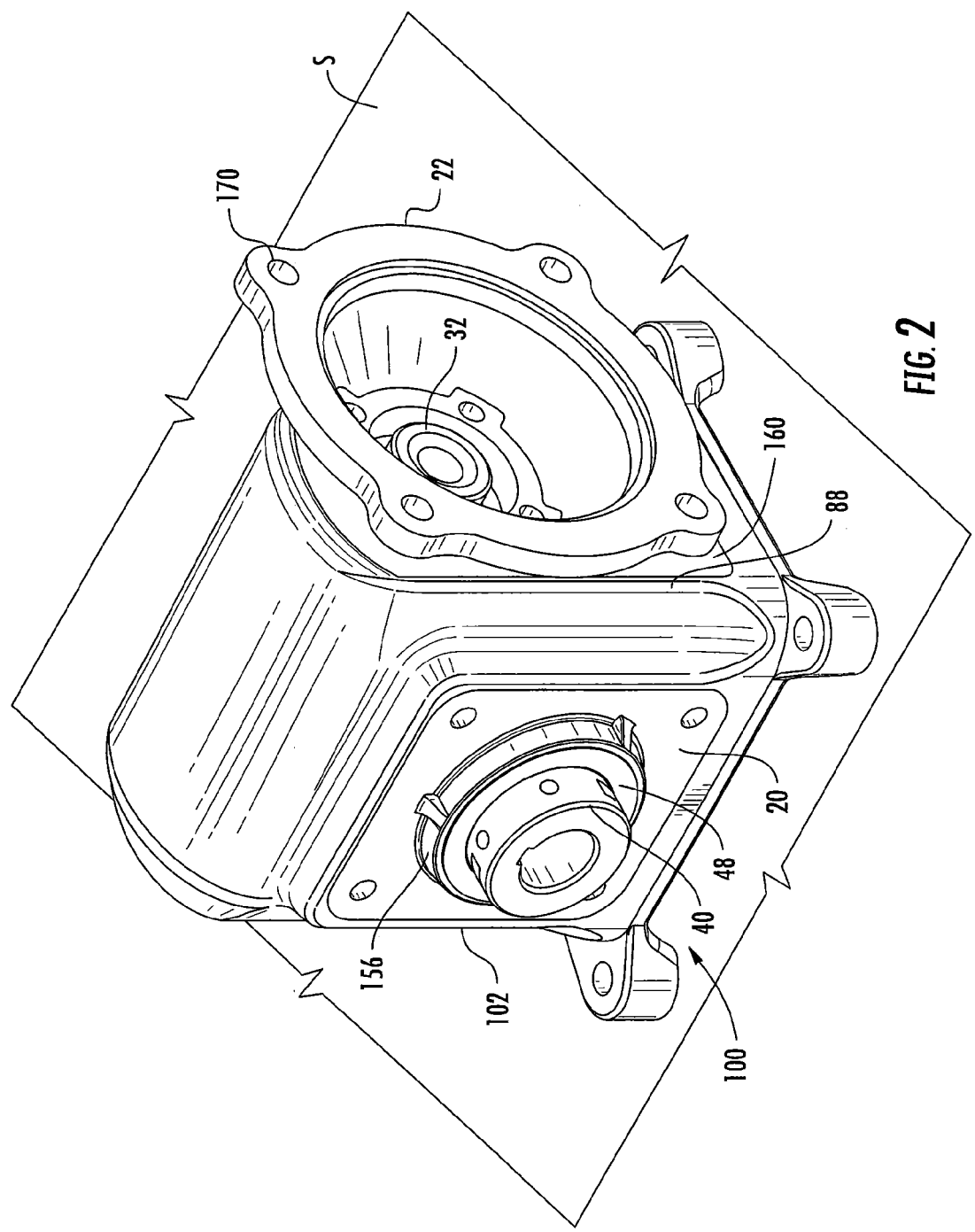
FIG. 2 is a front perspective view of the gear drive and gearbox assembly of FIG. 1.
Figure 3:
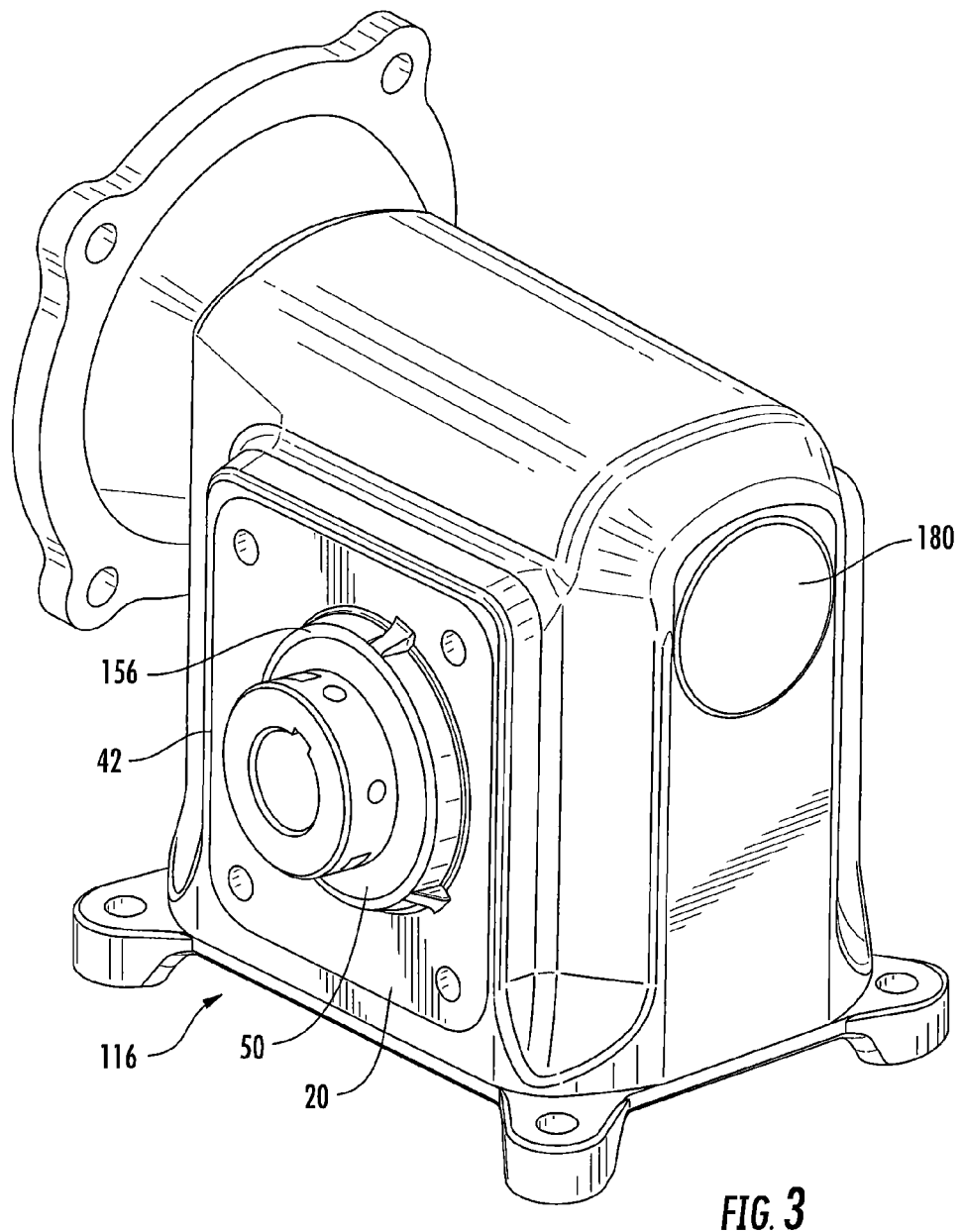
FIG. 3 is a rear perspective view of the gear drive and gearbox assembly of FIG. 1.

A gear drive and gearbox assembly 10 is illustrated in FIGS. 1-3. Referring to FIG. 1, the assembly 10 includes a gear drive assembly 12. The drive assembly 12 is held within an inner housing or endoskeleton 14 and an outer housing or exoskeleton 16. The inner housing 14 is coupled to a base or bottom plate 18. The outer housing 16 is coupled to the inner housing 14. Bearing caps 20 are coupled to opposite side portions of the outer housing 16. A motor flange 22 is coupled to a front portion of the outer housing 16.

Figure 4:
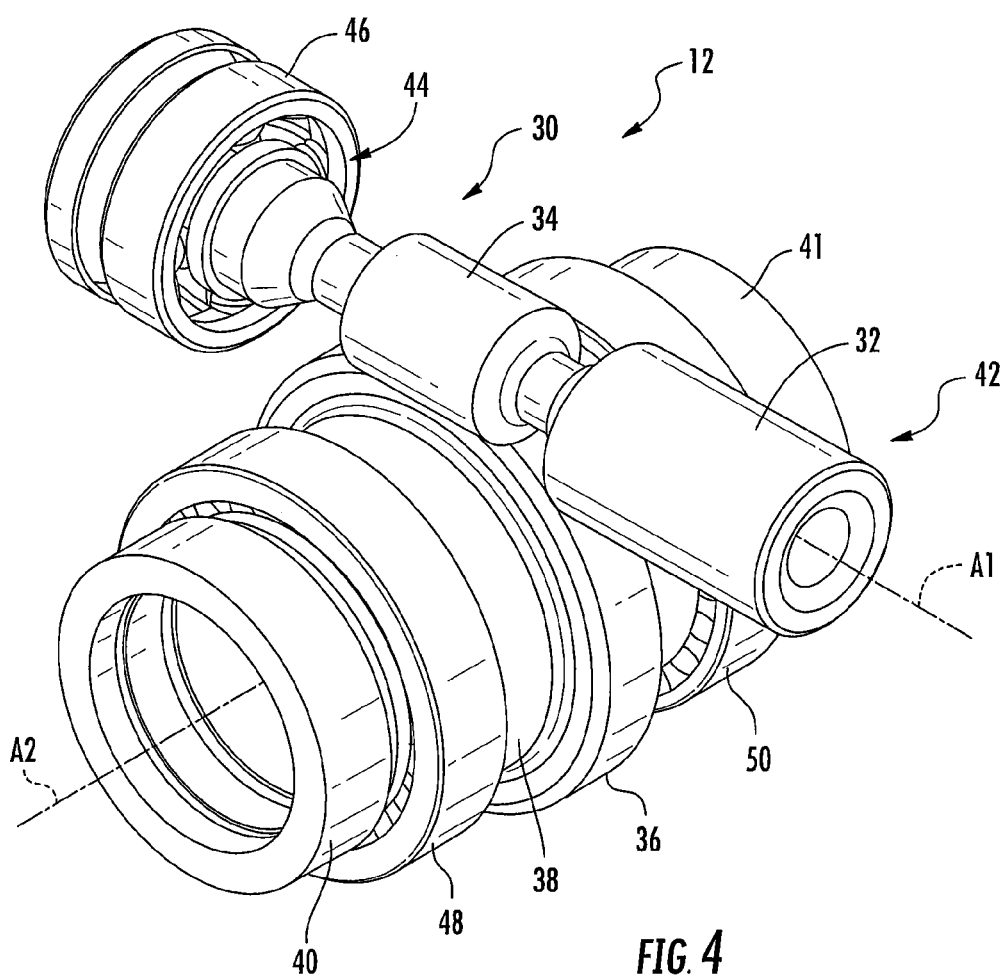
FIG. 4 is a perspective view of a drive assembly used with the gear drive and gearbox assembly of FIG. 1 according to some embodiments.
Figure 5:
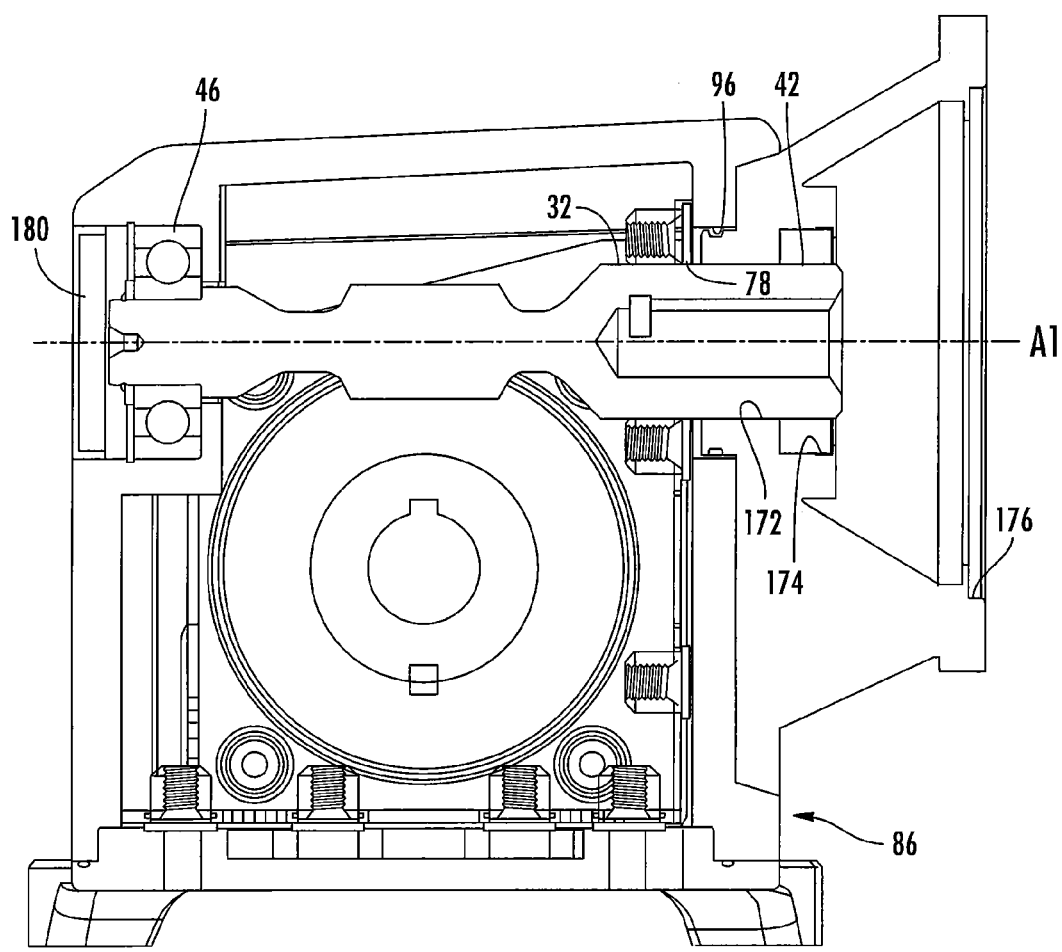
FIG. 5 is a longitudinal sectional view of the gear drive and gearbox assembly of FIG. 1.
Figure 6:
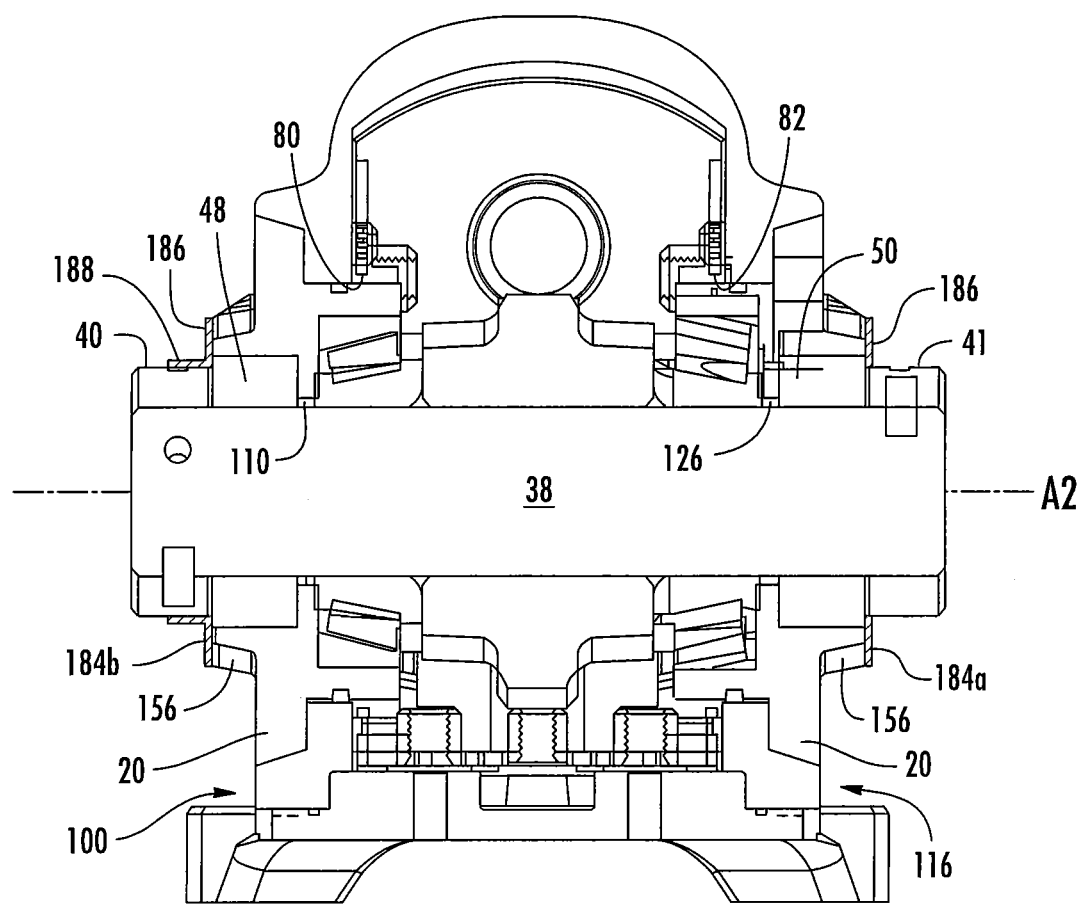
FIG. 6 is a transverse sectional view of the gear drive and gearbox assembly of FIG. 1.

Referring to FIGS. 4-6, the gear drive assembly 12 includes a worm drive including an input or worm shaft 32, a worm screw 34 and a worm wheel 36. An output shaft 38 is coupled to the worm wheel 36. The output shaft 38 includes first and second opposite ends 40, 41. The worm shaft 32 defines a longitudinal axis A1 and the output shaft 38 defines a transverse axis A2.

The input shaft 32 includes proximal and distal ends 42, 44. A bearing carrier 46 is at or adjacent the distal end 44 of the shaft 32. Seals 48, 50 are at or adjacent the first and second ends 40, 41 of the output shaft 38, respectively.

Figure 7:
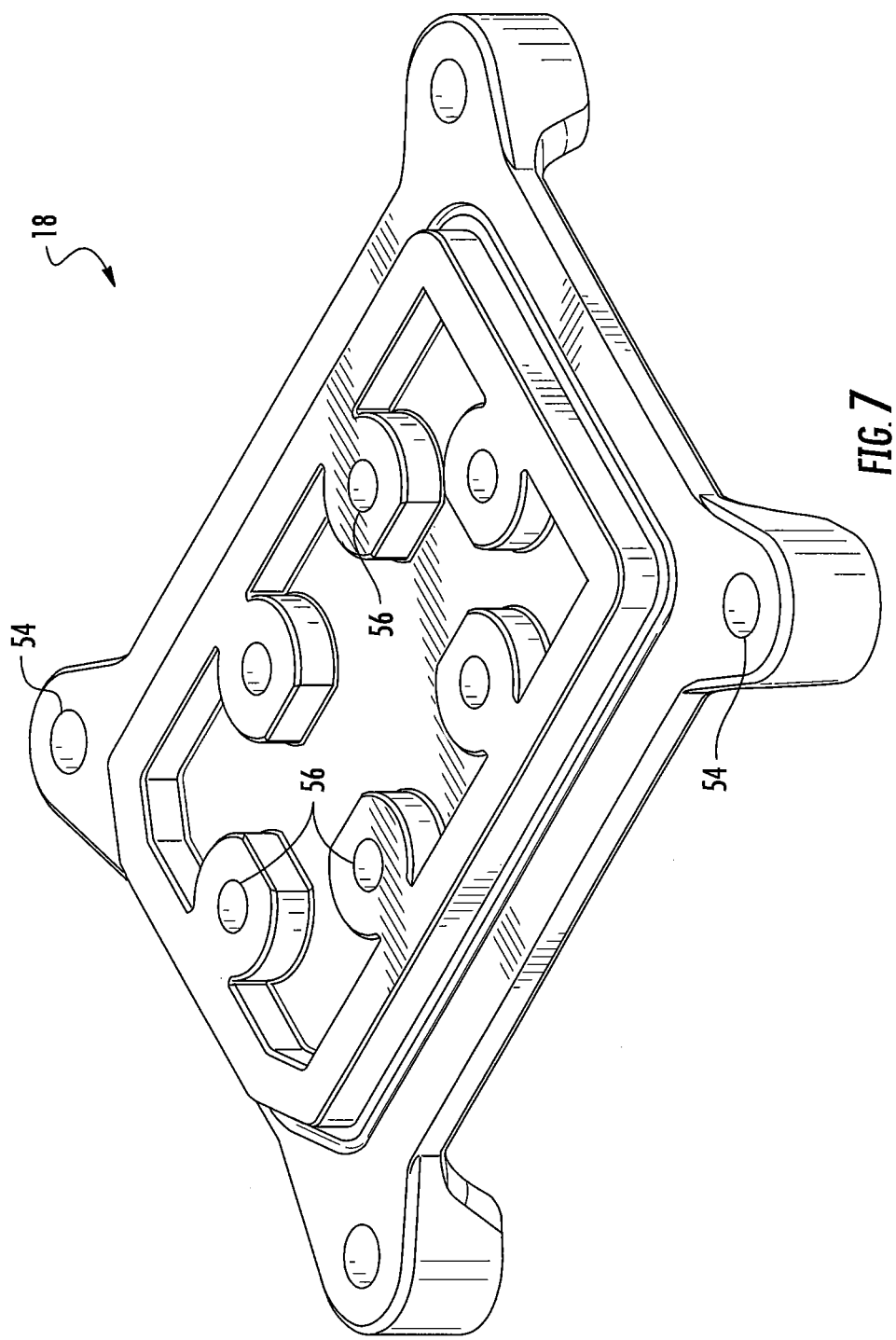
FIG. 7 is a perspective view of a base plate of the gear drive and gearbox assembly of FIG. 1.

Referring to FIG. 7, the base plate 18 includes a plurality of outer apertures or passageways 54 and a plurality of inner apertures or passageways 56. In some embodiments, the apertures 54 and/or the apertures 56 are threaded. The outer apertures 54 are configured to receive fasteners (e.g., bolts) therethrough so that the base plate 18 can be mounted to a mounting surface S (FIG. 2) such as a floor or a tabletop.

The base plate 18 may be configured to have the same mounting footprint as known cast iron and stainless steel gearbox assemblies commonly used in the food, beverage and pharmaceutical industries or other industries that are concerned with microbial growth. In this regard, the gear drive and gearbox assembly 10 or components thereof can be used as a drop-in replacement.

In addition, the gear drive and gearbox assembly 10 or components thereof may be configured to maintain the same gear reduction ratios commonly used in the food, beverage and pharmaceutical industries. The sizes of the components such as the base plate 18 and the inner and outer housings 14, 16 may be based on the center distances between the centerline of the worm shaft and the centerline of the output shaft. For example, the components may be sized for center distances of 1.5 inches, 1.75 inches, 2.0 inches, 2.38 inches and/or 2.62 inches.

Figure 8:
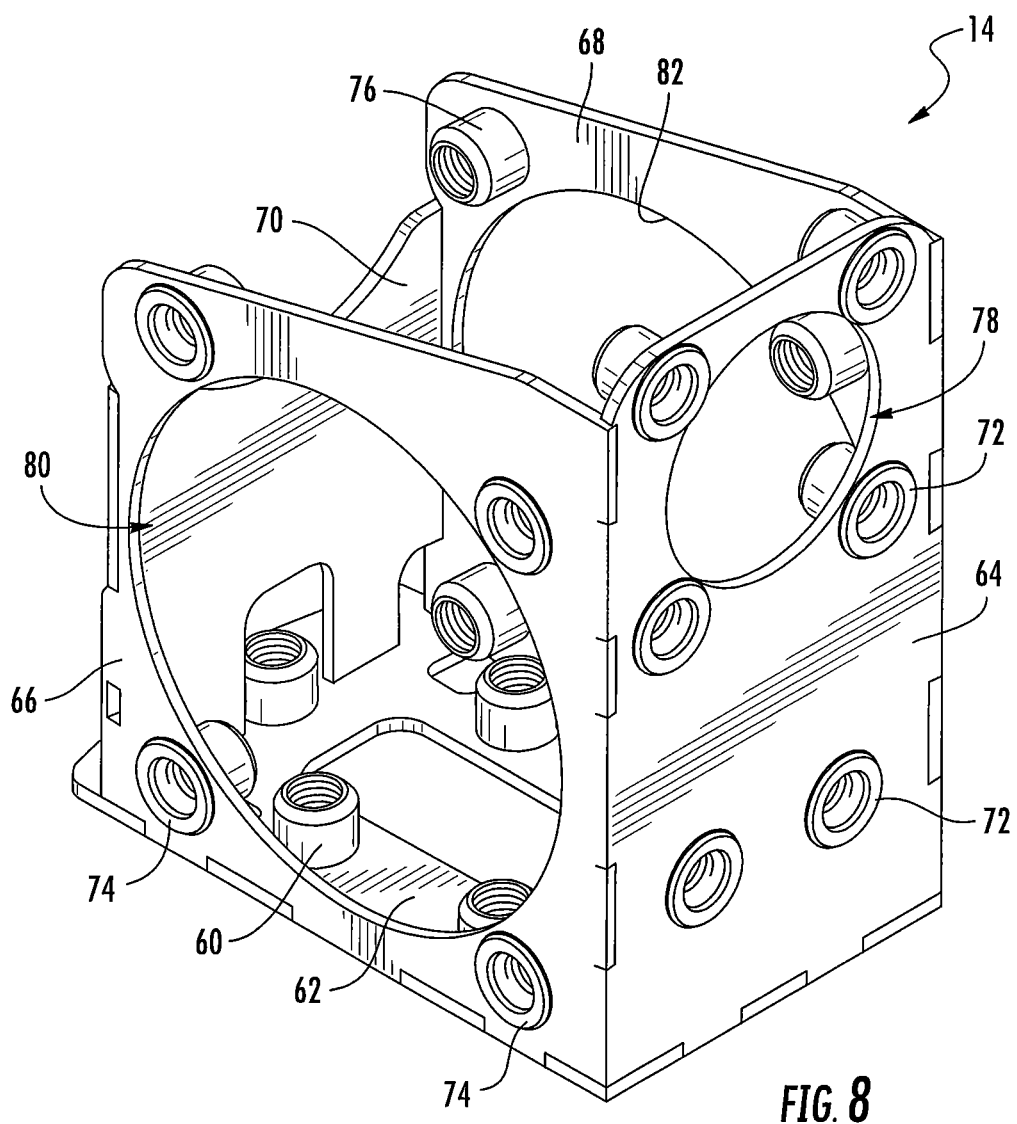
FIG. 8 is a perspective view of an inner housing of the gear drive and gearbox assembly of FIG. 1.

Referring to FIGS. 7 and 8, a plurality of bottom bosses 60 are on a bottom surface or wall 62 of the inner housing 14. The inner apertures 56 of the base plate 18 may be aligned with the bottom bosses 60 of the inner housing 14 and fasteners may be received through the aligned apertures 56 and bosses 60 so that the inner housing 14 is coupled to the base plate 18.

Still referring to FIG. 8, the inner housing 14 includes a front surface or wall 64, a first side surface or wall 66 and a second opposite side surface or wall 68. The inner housing 14 optionally includes a rear surface or wall 70. A plurality of front bosses 72 are on the front surface 64, a plurality of first side bosses 74 are on the first side surface 66 and a plurality of second side bosses 76 are on the second side surface 68 of the inner housing 14.

A front opening 78 is defined in the front surface 64 of the inner housing 14. A first side opening 80 is defined in the first side surface 66 of the inner housing 14. A second side opening 82 is defined in the second side surface 68 of the inner housing 14.

Figure 9:
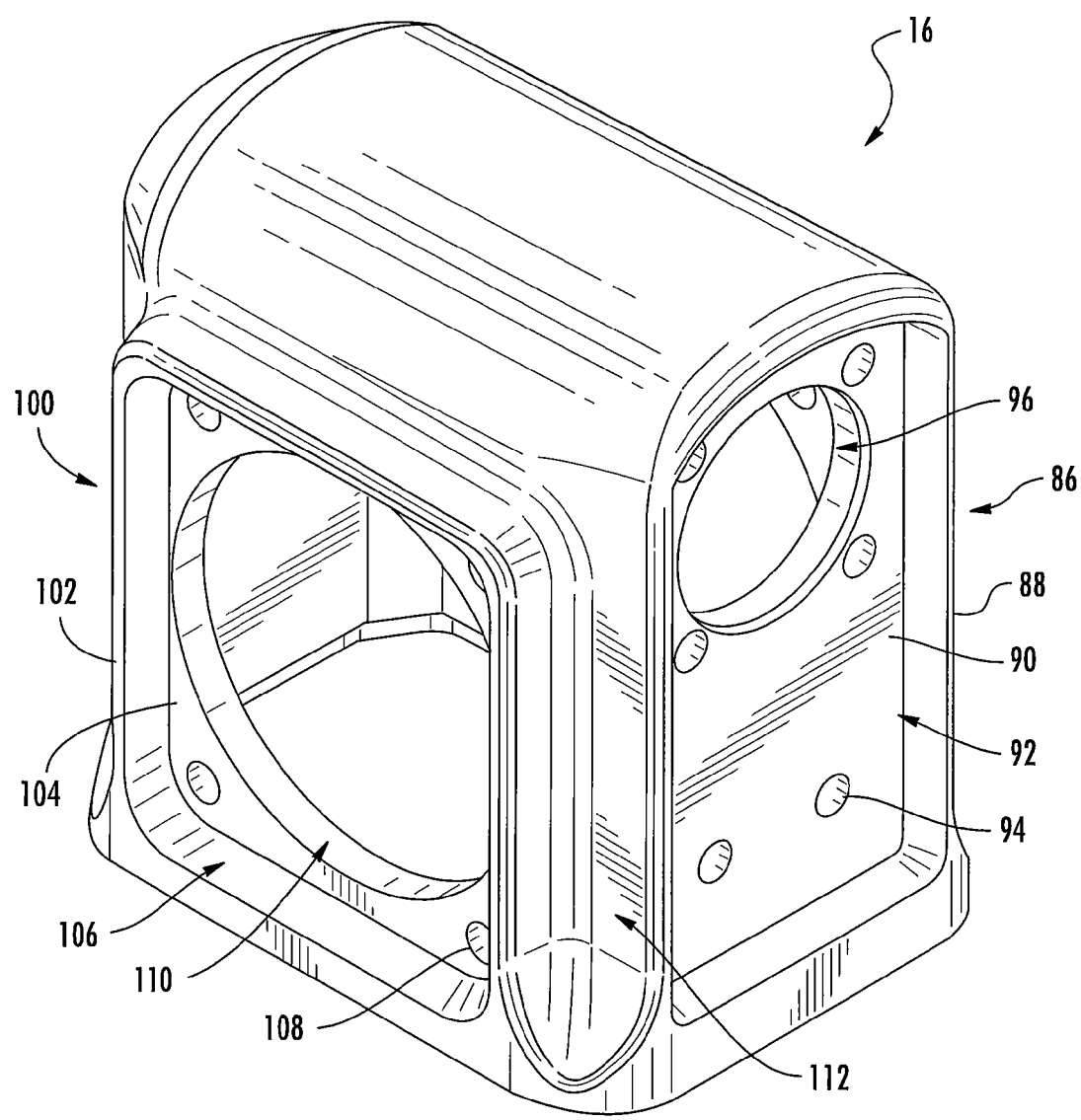
FIG. 9 is a front perspective view of an outer housing of the gear drive and gearbox assembly of FIG. 1.
Figure 10:
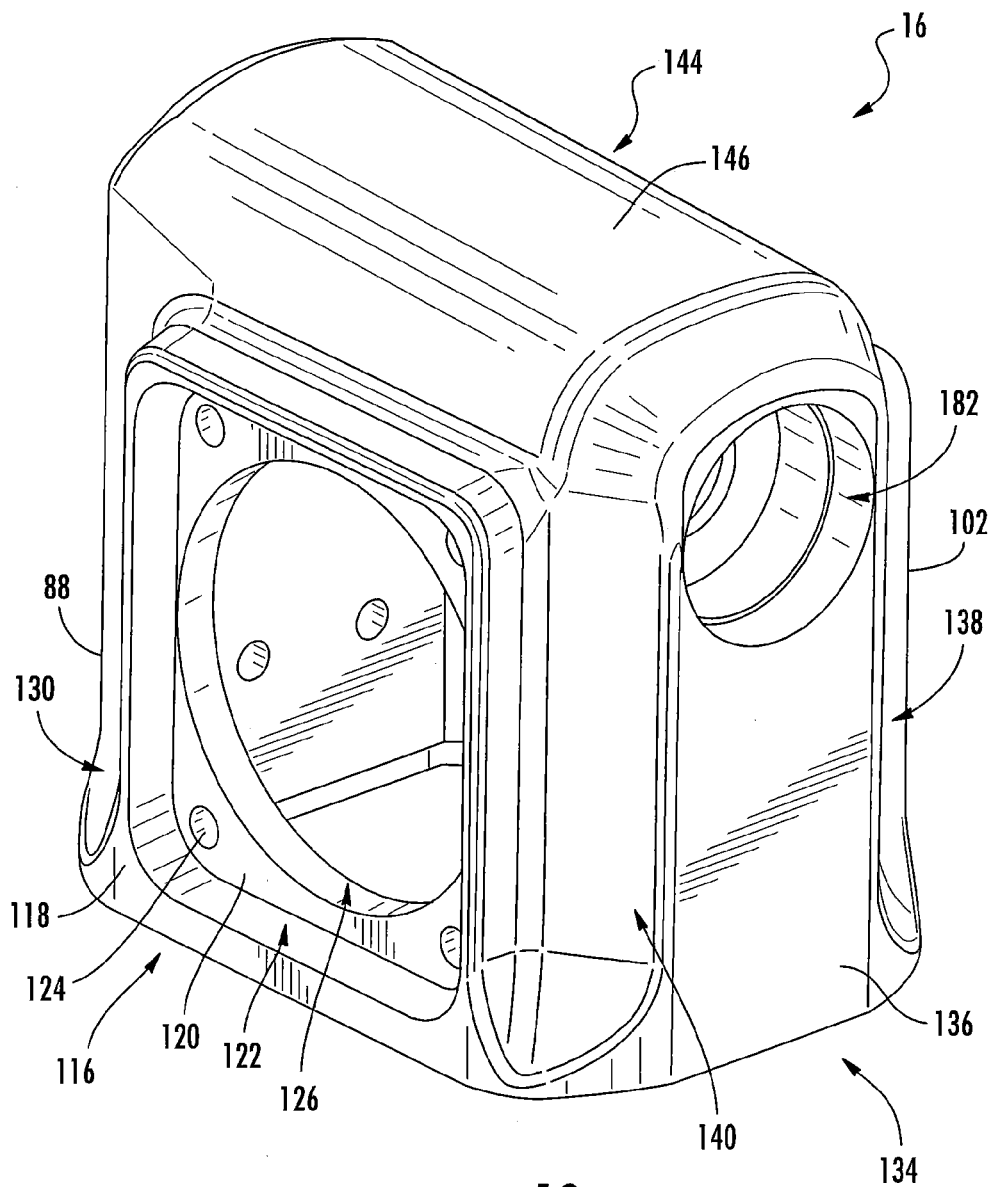
FIG. 10 is a rear perspective view of an outer housing of the gear drive and gearbox assembly of FIG. 1.

Turning to FIGS. 9 and 10, the outer housing 16 includes a front portion 86. The front portion 86 includes a front raised portion 88. The front raised portion 88 and a front surface 90 define a front recess 92. A plurality of apertures 94 are defined in the front surface 90. A front opening 96 is also defined in the front surface 90.

The outer housing 16 includes a first side portion 100. The first side portion 100 includes a first side raised portion 102. The first side raised portion 102 and a first side surface 104 define a first side recess 106. A plurality of first side apertures 108 are defined in the first side surface 104. A first side opening 110 is also defined in the first side surface 104.

The front raised portion 88 and the first side raised portion 102 define a front first side open channel 112. The front first side channel 112 curves outwardly from a top of the housing 16 to a bottom of the housing 16. The front first side channel 112 facilitates runoff of fluids such as cleaning solutions.

Referring to FIG. 10, the outer housing 16 includes a second side portion 116. The second side portion 116 includes a second side raised portion 118. The second side raised portion 118 and a second side surface 120 define a second side recess 122. A plurality of second side apertures 124 are defined in the second side surface 120. A second side opening 126 is also defined in the second side surface 120.

The front raised portion 88 and the second side raised portion 118 define a front second side open channel 130. The front second side channel 130 curves outwardly from a top of the housing 16 to a bottom of the housing 16. The front second side channel 130 facilitates runoff of fluids such as cleaning solutions.

The outer housing 16 includes a back portion 134 having a back surface 136. The first side raised portion 102 and the back surface 136 define a back first side open channel 138. The back first side channel 138 curves outwardly from a top of the housing 16 to a bottom of the housing 16. Similarly, the second side raised portion 118 and the back surface 136 define a back second side open channel 140. The back second side channel 140 curves outwardly from a top of the housing 16 to a bottom of the housing 16. The back first and second side channels 138, 140 facilitate runoff of fluids such as cleaning solutions.

The outer housing 16 includes a top portion 144 having a top surface 146. The top surface 146 is elongated and arcuate. This configuration also facilitates runoff of fluids such as cleaning solutions.

Referring to FIGS. 9 and 10, the outer housing 16 includes little to no flat surfaces on which fluids can easily collect. In addition to the channels and the arcuate top surface described above, the outer housing 16 is contoured between the top surface 146 and each of the first side raised portion 102, the second side raised portion 118 and the back surface 136.

As described above, the outer housing 16 can be coupled to the inner housing 14. Referring to FIGS. 8-10, the front bosses 72 of the inner housing 14 are aligned with the front apertures 94 of the outer housing 16, the first side bosses 74 of the inner housing 14 are aligned with the first side apertures 108 of the outer housing 16, and the second side bosses 76 of the inner housing 14 are aligned with the second side apertures 124 of the outer housing 16. Fasteners can then be received through the aligned bosses and apertures to couple the inner and outer housings 14, 16.

With the inner and outer housings 14, 16 coupled, the front opening 78 of the inner housing 14 is aligned with the front opening 96 of the outer housing 16, the first side opening 80 of the inner housing 14 is aligned with the first side opening 110 of the outer housing 16, and the second side opening 82 of the inner housing 14 is aligned with the second side opening 126 of the outer housing 16.

Referring to FIGS. 2-6, and in particular FIG. 5, the drive assembly 12 can be held within the inner and outer housings 14, 16 such that the input shaft 32 extends through the front opening 78 of the inner housing 14 and the front opening 96 of the outer housing 16. The front opening 78 of the inner housing 14 and the front opening 96 of the outer housing 16 may be aligned along the longitudinal axis A1 (which may also be referred to as the longitudinal axis A1 of the inner housing 14 and/or the outer housing 16). At least a portion of the proximal end 42 of the input shaft 32 may be outside the outer housing front portion 86.

Referring to FIGS. 2-6, and in particular FIG. 6, the drive assembly 12 can be held within the inner and outer housings 14, 16 such that the output shaft 38 extends through the first side opening 80 of the inner housing 14 and the first side opening 110 of the outer housing 16. The output shaft 38 also extends through the second side opening 82 of the inner housing 14 and the second side opening 126 of the outer housing 16. The first side opening 80 of the inner housing 14, the first side opening 110 of the outer housing 16, the second side opening 82 of the inner housing 14 and the second side opening 126 of the outer housing 16 may be aligned along the transverse axis A2 (which may also be referred to as the transverse axis A2 of the inner housing 14 and/or the outer housing 16). The first end 40 of the output shaft 38 may be outside the outer housing first side portion 100 and the second end 41 of the output shaft 38 may be outside the outer housing second side portion 116.

Figure 11:
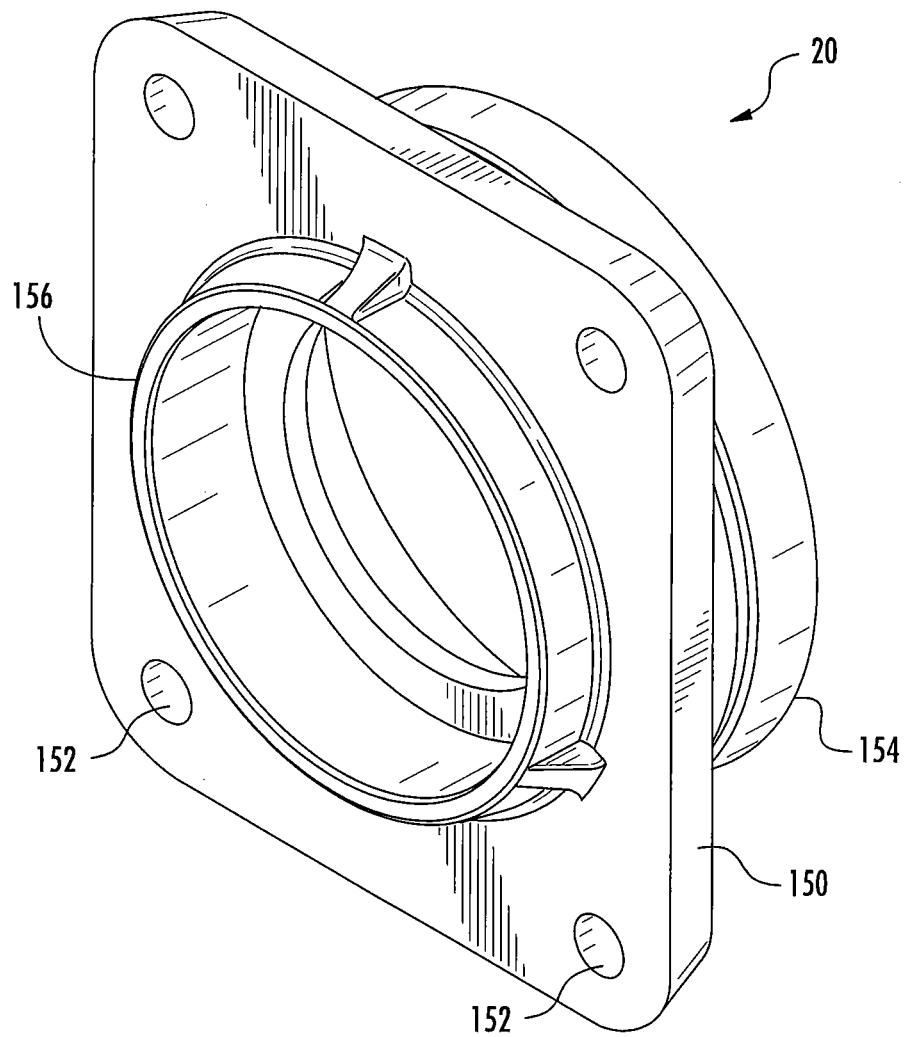
FIG. 11 is a perspective view of a bearing cap of the gear drive and gearbox assembly of FIG. 1.

Turning now to FIG. 11, the bearing cap 20 includes a plate or plate portion 150. A plurality of plate apertures 152 are defined in the plate 150. The bearing cap 20 includes a first cylindrical portion 154 extending from one side of the plate 150 and a second cylindrical portion 156 extending from the opposite side of the plate 150.

Referring to FIGS. 2 and 3, one bearing cap 20 is configured to be received in the outer housing first side portion 100 and one bearing cap 20 is configured to be received in the outer housing second side portion 116. Specifically, the bearing cap plate 150 (FIG. 11) is sized and configured to fit within the outer housing first side recess 106 (FIG. 9). The plate apertures 152 align with the outer housing first side apertures 108. Fasteners can be received through the aligned apertures to couple the bearing cap 20 to the outer housing 16. In this position, the bearing cap plate 150 may be flush with the outer housing first side raised portion 102. This configuration does not introduce uneven surfaces in which foreign objects can easily collect.

Referring to FIG. 6, with the bearing cap plate 150 received in the outer housing first side recess 106, the seal 48 adjacent the first end 40 of the output shaft 38 may be at least partially surrounded by the bearing cap 20. A portion of the seal 48 may also be surrounded by the bearing cap second cylindrical portion 156. A front of the seal 48 may be flush with a front of the bearing cap second cylindrical portion 156 so that uneven surfaces are not formed.

The plate 150 of another bearing cap 20 (FIG. 11) can be received in the outer housing second side recess 122 (FIG. 10). The plate apertures 152 align with the outer housing second side apertures 124. Fasteners can be received through the aligned apertures to couple the bearing cap 20 to the outer housing 16. In this position, the bearing cap plate 150 may be flush with the outer housing second side raised portion 118 so that uneven surfaces are not formed.

Referring to FIG. 6, the seal 50 adjacent the second end 41 of the output shaft 38 may be received in the bearing cap 20. The bearing cap 20 may surround at least a portion of the seal 50. A portion of the seal 50 may also be surrounded by the bearing cap second cylindrical portion 156. A front of the seal 50 may be flush with a front of the bearing cap second cylindrical portion 156 so that uneven surfaces are not formed.

Still referring to FIG. 6, seal covers may be used to cover and protect the seals 48, 50. The seal cover may be a rotating flinger type seal that rotates with the output shaft 38. For example, the seal cover 184a shown in FIG. 6 includes an annular layer or portion 186 that surrounds the output shaft 38. The annular layer 186 is positioned adjacent the seal 50 and the second cylindrical portion 156 of the bearing cap 20. Alternatively, the seal cover 184b has a stepped configuration with an annular layer or portion 186 that surrounds the output shaft 38 and an extended layer or portion 188 that extends along a portion of the output shaft 38.

Washdown procedures in the food processing industry often damage seals and allow the gearbox oil to leak. As a result, many known gearboxes use food grade oil which may be inefficient and/or increase cost. Embodiments of the present invention advantageously use the seal covers described above to help prevent seal damage and associated oil leakage.

Figure 12:
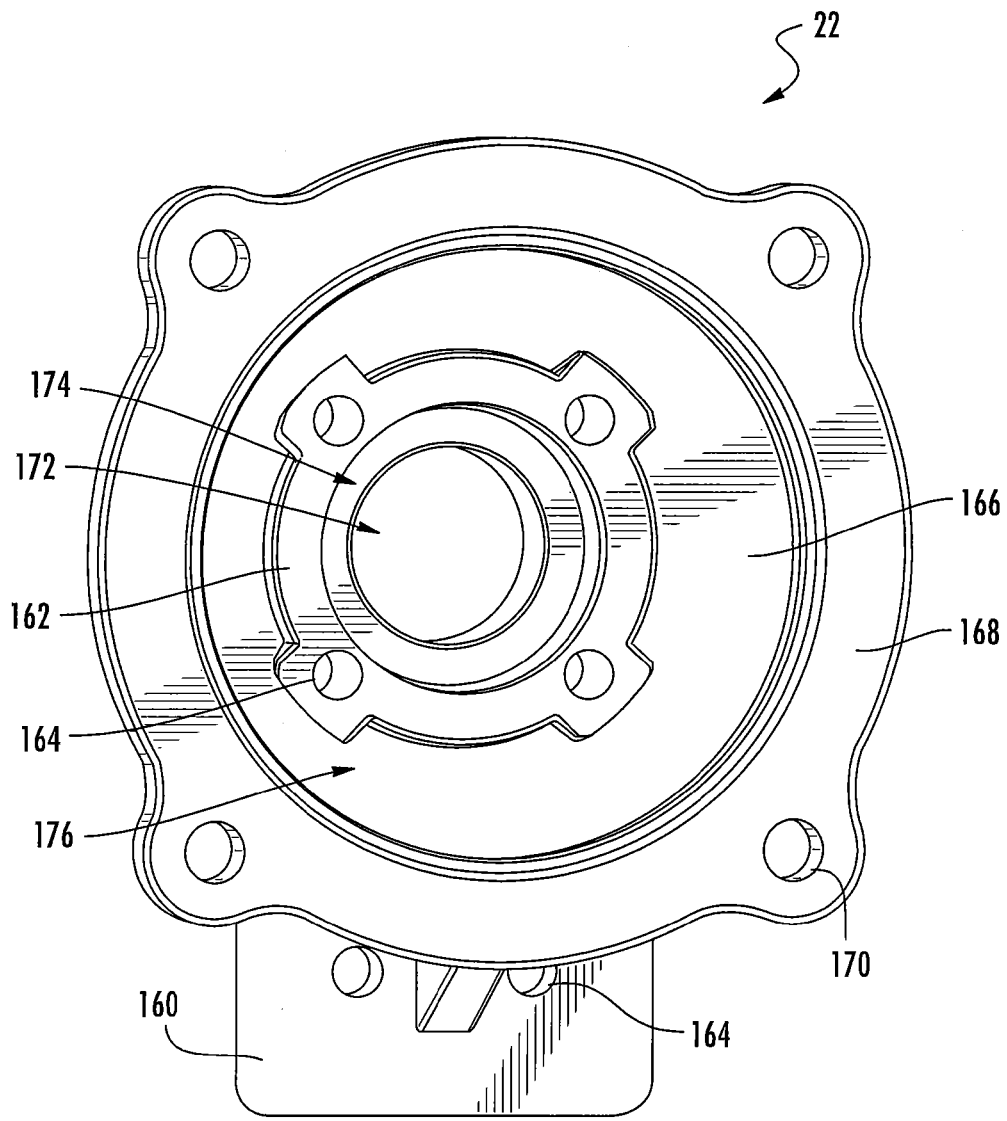
FIG. 12 is a perspective view of a motor flange of the gear drive and gearbox assembly of FIG. 1.

Turning now to FIG. 12, the motor flange 22 includes a plate 160 and a raised portion 162 extending from the plate 160. A plurality of apertures 164 are formed in the plate 160 and the raised portion 162. The motor flange 22 includes a conical portion 166 terminating in a flange 168. A plurality of apertures 170 are defined in the flange 168.

A plate opening 172 is defined in the motor flange plate 160. A raised portion opening 174 is defined by the motor flange raised portion 162. A flange opening 176 is defined by the flange 168. The centers of the plate opening 172, the raised portion opening 174 and the flange opening 176 may be coaxial.

Referring to FIGS. 2, 9 and 12, the motor flange plate 160 is sized and configured to fit within the outer housing front recess 92 with the motor flange apertures 164 aligned with the outer housing front apertures 94. Fasteners may be received through the aligned apertures to couple the motor flange 22 to the outer housing 16. In this position, the motor flange plate 160 may be flush with the outside housing front raised portion 88 so that uneven surfaces are not formed.

Referring to FIG. 5, the input shaft 32 and/or the proximal end portion 42 thereof extends through the motor flange plate opening 172 and the motor flange raised portion opening 174. The plate opening 172, the raised portion opening 174 and the flange opening 176 may be centered along the longitudinal axis A1.

Referring to FIGS. 3, 5 and 10, a plug 180 may be received and held at the back portion 134 of the outer housing 16. The plug 180 may be received and held in an opening 182 defined in the outer housing back surface 136

(FIG. 10). The plug 180 may be flush with the outer housing back surface 136 so that uneven surfaces are not formed.

Most known gearbox housings used in the food industry have square or rectangular shapes that inherently include flat surfaces (including flat horizontal surfaces) and sharp edges. These gearbox housings are typically formed of cast iron or stainless steel that can further include cracks or other microscopic or macroscopic defects. The cast iron or stainless steel gearbox housings are often painted and the paint can chip over time and the exposed metal can rust. These characteristics have a tendency to capture foreign objects even during typical wash down procedures in the food industry. These foreign objects can lead to bacteria growth and can create food odor and/or staining. Moreover, it is undesirable for rust to develop on or around food processing equipment as the rust can migrate to the food product.

In contrast, in accordance with some embodiments of the present invention, the outer housing 16 is molded. The molded outer housing 16 may be shaped as desired including having the contoured outer surfaces and/or open channels as described above. In some embodiments, the outer housing 16 is injected molded. In some other embodiments, the outer housing 16 is compression molded. In addition, the outer housing may be shaped so that various components, such as the bearing caps 20, the motor flange 22 and/or the plug 180 are received in recesses such that these components are flush with the outer surface of the outer housing 16. As a result, coupling these components to the outer housing 16 does not result in ledges or uneven surfaces.

The shape and configuration of the outer housing 16 as described above helps to reduce or eliminate areas where foreign objects can be trapped after typical wash down procedures in the food industry. Accordingly, bacteria growth, harboring of foodborne pathogens, and food odor and/or staining can be reduced or eliminated.

In some embodiments, the outer housing 16 includes antimicrobial additives or fillers. For example, the antimicrobial additives may be compounded during the molding process. The antimicrobial additives may be, but are not limited to, zinc, silver and/or copper ions. The antimicrobial additives can further reduce or eliminate bacteria growth and food odor and/or staining on the outer housing 16. The antimicrobial additives are blended throughout the polymer (i.e., not just on an outer surface). In this regard, the antimicrobial additives remain active even if the outer housing 16 is scratched.

The outer housing 16 may be formed of any suitable polymer. Exemplary suitable polymers include polypropylene (PP) and polyphenylene ether (PPE). The polymer material has a strength and structure that can withstand wash down chemicals that are used in typical wash down procedures in the food processing industry. Such wash down procedures can be carried out at a variety of pressures (including high pressures) and/or temperatures that can introduce varying levels of strain on the outer housing 16. In some embodiments, the polymer material is robust in the harsh food processing during sanitation and cleaning process that may use caustics and sanitizers with pH levels ranging from 2.0 to 12.5.

As noted above, the polymer material of the outer housing 16 may be impregnated with antimicrobial additives to significantly reduce or eliminate the possibility of bacteria growth as well as food odor and/or staining. These or additional additives or fillers may be used to help ensure proper heat transfer. On the one hand, the heat transfer (e.g., the thermal conductivity of the outer housing 16) should be sufficient to prevent internal components from getting too hot which may lead to oil degradation or other performance issues. On the other hand, it may be desirable to limit the temperature of the surface of the outer housing 16 due to possible human contact during and/or shortly after operation.

In some embodiments, the outer housing 16 is monolithic. The polymer outer housing 16 is lightweight and easy to install relative to heavy cast metal gearboxes. In addition, the outer housing 16 may be formed to tighter dimensional tolerances relative to cast metal gearboxes, particularly when the outer housing 16 is injection molded. This can further facilitate ease of installation.

The base 18 may be formed of a polymer such as the exemplary polymers described above in reference to the outer housing 16. The base may be molded (e.g., injection or compression molded). Antimicrobial additives may be blended in the polymer of the base 18 to provide the advantages described above in reference to the outer housing 16.

The inner housing 14 can provide strength to carry a portion of the loading during operation and can provide dimensional stability and/or structural rigidity of the gearbox assembly. The inner housing 14 also provides a convenient frame that brings the gearbox components together for ease of assembly.

In operation, a motor may be coupled to the motor flange 22 using the flange apertures 170 with the motor shaft coupled to the input shaft 32 (FIG. 2). A clamp side bushing assembly may be coupled to one of the output shaft ends 40, 42 and a support side bushing assembly may be coupled to the other one of the output shaft ends 40, 42 (FIGS. 2 and 3). The clamp side bushing assembly may include a closed cover and the support side bushing assembly may include a coupler to couple the output shaft to a shaft associated with the equipment to be operated (e.g., an auger or a conveyor).

Figure 13:
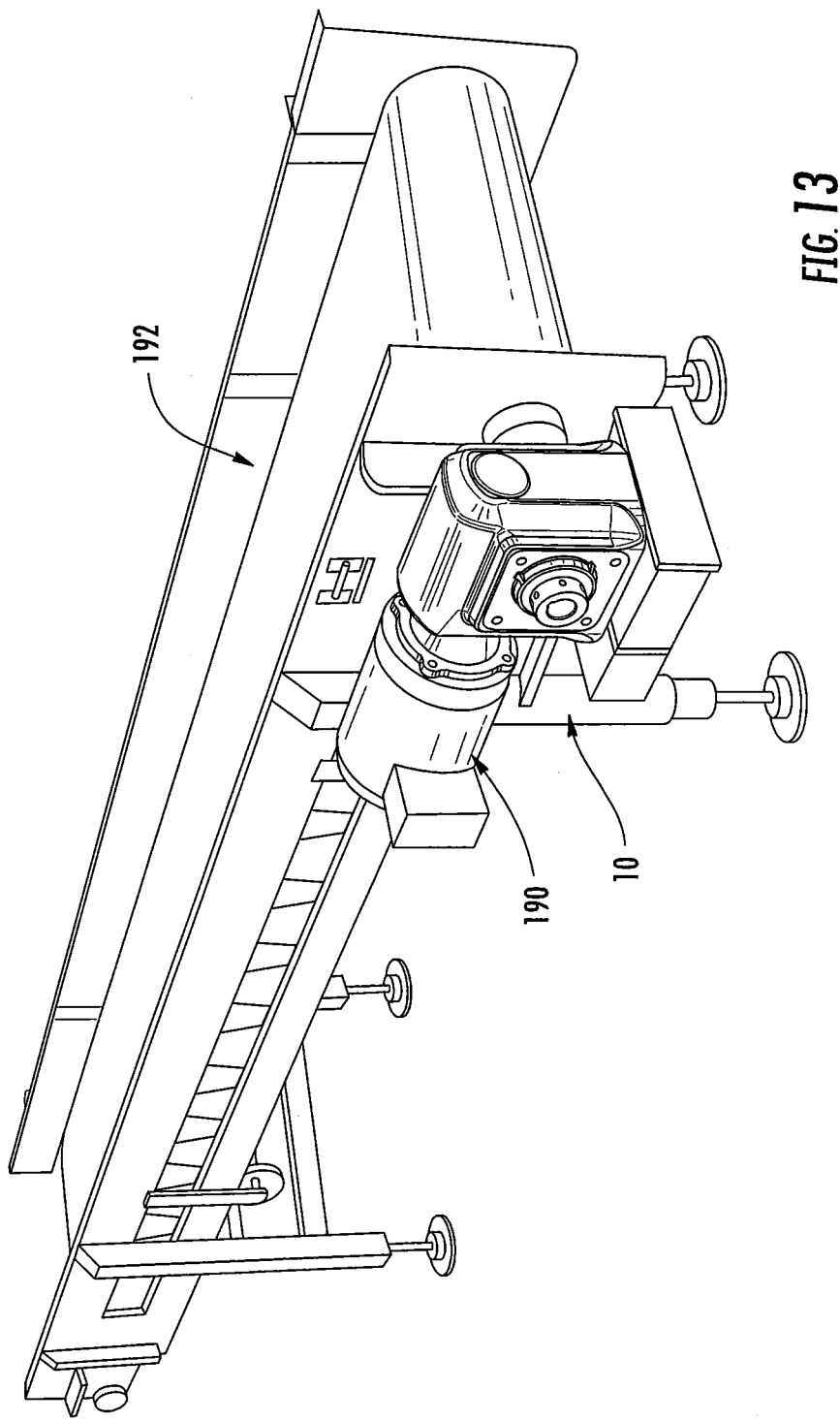
FIG. 13 is a perspective view of an exemplary system using the gear drive and gearbox assembly of FIG. 1.

An exemplary system is shown in FIG. 13. In the exemplary system, a motor 190 is operatively coupled to a conveyor 192 by the gear drive and gearbox assembly 10.

Although the gear drive and gearbox assembly 10 has been described herein using right-angle or worm gear drive assemblies, the present invention is not limited thereto. For example, those skilled in the art will appreciate that modifications can be made to the assembly, including to the inner and/or outer housings, to accommodate other types of gear drive assemblies such as an inline gear drive or a parallel gear drive.

Although advantages of gear box assemblies according to embodiments described herein have been described with reference to the food processing industry, it will be appreciated that the gear box assemblies according to embodiments described herein can be advantageously used in any industry seeking reduced gearbox housing temperature, reduced bacteria growth, reduced likelihood of liquid or foreign objects being trapped and/or reduced gearbox weight for ease of lifting.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the teachings and advantages of this invention. Accordingly, all such modifications are intended to be included within the scope of this invention as defined in the claims. The invention is defined by the following claims, with equivalents of the claims to be included therein.

What is claimed is:

1. A gearbox housing assembly comprising:
a base plate;
a metal inner gearbox housing coupled to the base plate, the metal inner gearbox having a plurality of bosses formed thereon;
a polymer outer gearbox housing on the base plate and surrounding the inner housing, the polymer outer gearbox having a plurality of apertures formed thereon, the plurality of apertures alignable with the plurality of bosses for receipt of a plurality of fasteners in the aligned plurality of bosses and plurality of apertures such that the polymer outer gearbox is removable from the metal inner gear box;
the inner housing comprising a front surface with a front aperture defined therein; the outer housing comprising a front surface with a front aperture defined therein that is aligned with the front aperture of the inner housing; wherein the aligned front apertures are configured to receive an input shaft therethrough;
the inner housing comprising a first side surface with a first side aperture defined therein and an opposed second side surface with a second side aperture defined therein; the outer housing comprising a first side surface with a first side aperture defined therein that is aligned with the first side aperture of the inner housing and an opposed second side surface with a second side aperture defined therein that is aligned with the second side aperture of the inner housing; wherein the aligned first side aligned apertures and the aligned second side aligned apertures are configured to receive an output shaft therethrough; and,
a first bearing cap coupled to the first side surface of the outer housing and a second bearing cap coupled to the second side surface of the outer housing.

2. The gearbox housing assembly of claim 1 wherein the outer housing is a molded polymer.

3. The gearbox housing assembly of claim 2 wherein the polymer of the outer housing is impregnated with antimicrobial additives.

4. The gearbox housing assembly of claim 2 wherein the outer housing is monolithic.

5. The gearbox housing assembly of claim 1 wherein the outer housing comprises an elongated arcuate top surface.

6. The gearbox housing assembly of claim 1 wherein:
the first side surface of the outer housing is surrounded by a first side raised portion defining a first side recess;
the second side surface of the outer housing is surrounded by a second side raised portion defining a second side recess;
the first bearing cap comprises a first plate held in the first side recess such that the first outer plate is flush with the first side raised portion; and
the second bearing cap comprises a second plate held in the second side recess such that the second outer plate is flush with the second side raised portion.

7. The gearbox housing assembly of claim 6 wherein:
the first bearing cap comprises a first cylindrical portion extending from the first plate and through the aligned first side apertures of the inner and outer housings; and
the second bearing cap comprises a second cylindrical portion extending from the second plate and through the aligned second side apertures of the inner and outer housings.

8. The gearbox housing assembly of claim 6 further comprising a motor flange coupled to the front surface of the outer housing.

9. The gearbox housing assembly of claim 8 wherein:
the front surface of the outer housing is surrounded by a front raised portion defining a front recess; and
the motor flange comprises a motor flange plate held in the front recess such that the motor flange plate is flush with the front raised portion.

10. The gearbox housing assembly of claim 8 wherein: the outer housing comprises a back surface;
the first side raised portion and the back surface define an open channel therebetween that slopes outwardly from the top of the outer housing to the bottom of the outer housing; and
the second side raised portion and the back surface define an open channel therebetween that slopes outwardly from the top of the outer housing to the bottom of the outer housing.

11. The gearbox housing assembly of claim 1 wherein:
the front surface of the outer housing is surrounded by a front side raised portion defining a front side recess;
the first side surface of the outer housing is surrounded by a first side raised portion defining a first side recess;
the second side surface of the outer housing is surrounded by a second side raised portion defining a second side recess;
the first side raised portion and the front side raised portion define an open channel therebetween that slopes outwardly from a top of the outer housing to a bottom of the outer housing; and
the second side raised portion and the front side raised portion define an open channel therebetween that slopes outwardly from the top of the outer housing to the bottom of the outer housing.

* * * * *